United States Patent [19]
McPherson et al.

[11] Patent Number: 5,491,767
[45] Date of Patent: Feb. 13, 1996

[54] GERMANATE GLASS FOR MID-INFRARED MEDICAL OPTICAL FIBER

[76] Inventors: Donald M. McPherson, 6018 Colby St., Oakland, Calif. 94618; Steven C. Murray, 1536 San Antonio St., Menlo Park, Calif. 94025

[21] Appl. No.: 239,247

[22] Filed: May 6, 1994

[51] Int. Cl.⁶ .................................. G02B 6/02; G02B 6/16
[52] U.S. Cl. .......................... 385/123; 385/142; 606/15; 606/16
[58] Field of Search .................................. 385/123, 142, 385/141; 606/15, 16

[56] References Cited

U.S. PATENT DOCUMENTS

| | | |
|---|---|---|
| 3,119,703 | 1/1964 | Cleek et al. . |
| 3,531,305 | 6/1967 | Dumbaugh . |
| 3,745,032 | 7/1973 | Miller et al. . |
| 3,769,047 | 10/1973 | Dumbaugh . |
| 3,911,275 | 10/1975 | Dumbaugh . |
| 4,385,128 | 5/1983 | Boudot et al. . |
| 4,824,809 | 5/1984 | McPherson . |
| 5,148,510 | 9/1992 | Borrelli et al. ........................ 385/142 |
| 5,274,728 | 12/1993 | Tran ...................................... 385/141 |

FOREIGN PATENT DOCUMENTS 802128  12/1968  Canada .

*Primary Examiner*—Rodney B. Bovernick
*Assistant Examiner*—Robert E. Wise
*Attorney, Agent, or Firm*—Steven F. Caserza; Flehr, Hohbach, Test, Albritton & Herbert

[57] ABSTRACT

This invention relates to a family of rugged, non-toxic, high damage threshold, fiberizable, infrared transmitting germanate glasses that are suitable for medical laser delivery. They possess excellent visible transmission to utilize an aim beam in conjunction with the infrared laser. The glasses comprise (in mol %) 23.0–76.0% $GeO_2$, 0–39.0% $Ga_2O_3$, 3.0–51.0% SrO, 8.0–17.0% $Ta_2O_5$, 0–23.0% $Y_2O_3$, 0–35.0% ZnO, and optionally one or more of the following components; 0–11.0% $TiO_2$, 0–20.0% $Nb_2O_5$, 0–8.0% $ZrO_2$, 0–13.0% $Cs_2O$, 0–10% MgO, 0–27% $La_2O_3$, 0–25.0% $Gd_2O_3$, 0–23.0% $Yb_2O_3$. These glasses have intrinsic absorption coefficients of less than 0.137, 0.048, 0.024 and 0.021 dB/m at 2.94, 2.796, 2.71 and 2.69 μm, respectively. The glasses are characterized by excellent chemical durability, low thermal expansion coefficient, high glass transition temperature, and good glass working properties such as low liquidus temperature, flat viscosity-temperature dependence and good resistance to devitrification. Specific embodiments are particularly well suited for use in biological applications where high chemical durability, non-toxicity, a high laser damage threshold and good infrared and visible transmission are required.

34 Claims, 4 Drawing Sheets

GERMANATE GLASS FOR MID-INFRARED MEDICAL OPTICAL FIBER

BRIEF SUMMARY OF THE INVENTION

The present invention relates generally to optical fibers, and more particularly to optical fibers with non-toxic germanate glass compositions for medical laser applications.

BACKGROUND OF THE INVENTION

Fiber optics deals with the transmission of light through small filamentary optical materials or fibers. The fibers comprise a central core and an outer surrounding cladding along the entire length of the fiber. The transmission of light through the fiber is based on the phenomenon of total internal reflection. For total internal reflection, the refractive index ($n_D$) of the core must be greater than the refractive index of the cladding.

Depending on the application, the materials used to fabricate the optical fiber vary. For example, long-haul or telecommunications-based optical fibers must provide low transmission loss and low absorption coefficient. Thus, silica-based materials are predominantly used to construct the fiber. On the other hand, short-haul applications such as optical fibers used in medical surgery instruments need not provide such a low transmission loss and the absorption coefficient is not as critical. Instead of specifically tailoring the materials to satisfy the needs of the medical community, the fibers used for surgical laser applications are still based on materials and properties that are more suitable for long-haul applications.

One type of short-haul application is the use of optical fibers for the transmission of mid-infrared (approximately 2–6 µm) laser light in medical instruments designed for invasive surgery. For such an application, the glass used to fabricate the fiber must satisfy other criteria such as non-toxicity, high laser damage threshold, excellent visible transmission for using an aim beam to direct the laser beam, low absorption coefficient at the laser wavelength, high glass transition temperature ($T_g$), low expansion coefficient ($\alpha$) high softening temperature ($T_s$) high chemical durability in water characterized by low values of $D_W$, low liquidus temperature ($T_l$) small temperature dependence of viscosity in the fiber drawing temperature region, and a strong resistance to devitrification. Additionally, mechanical and power handling properties are important for some applications. No glass composition for optical fibers in the present state of the art meets all of these criteria.

When these medical instruments are used to cut tissue with laser light, the laser light must be highly absorbed by the tissue. Because water is a ubiquitous and large constituent of animal tissue, medical researchers have naturally focused their attention on developing lasers which operate at wavelengths of light which are strongly absorbed by water. High absorption implies that the laser light is absorbed by water in the tissue completely before it travels (or penetrates) into the tissue.

The highest water absorption occurs near 3 µm. Pulsed Cr:Tm:Er:YAG, Er:YLF, Er:YSGG, and Er:YAG lasers operating at 2.69, 2.71, 2.796, and 2.94 µm are of great interest for medical applications because their radiation is not only highly absorbed by water but also by the organic matrix and inorganic calcium salts which comprise bone, enamel, and other biological materials. This very superficial penetration depth allows both hard and soft tissues to be ablated very precisely and quickly with virtually no tissue charring.

One reliable and well developed solid state laser is the Erbium laser operating near 3 µm which is either efficiently flashlamp or laser diode excited. The problem which continues to seriously limit the clinical utility of erbium lasers is the lack of a suitable delivery system. Some delivery systems that have been used include articulated arms, hollow waveguides, both single and polycrystalline fibers, and silver halide and metal fluoride fibers. Articulated arms and waveguides are expensive, large, cumbersome, and not easily sterilized. Crystalline fibers, like sapphire, are expensive, and are about 10 times as brittle as quartz fibers of the same diameter. Silver halide fibers are soft, slightly water soluble, and have a poor shelf life. The metal fluoride fibers are the most developed of the 3 µm fiber optics. However, metal fluoride fibers, although tolerable for telecommunications, are unsuitable for many medical applications. In particular, zirconium and aluminum fluoride fibers are brittle, not very flexible, suffer from poor thermal properties, and are toxic and water soluble. Although a sapphire window has been used to isolate the fluoride fiber from tissue, this is not completely reliable and necessarily increases the size and cost of the delivery system.

A tremendous research effort driven by the needs of the telecommunication industry has been directed at developing ultra-low loss fibers suitable for long-haul applications. The emphasis has almost exclusively shifted towards heavy-metal fluoride glasses, based primarily on their intrinsically low losses, wide infrared window, and the relative ease of removing extrinsic impurities which absorb at wavelengths desirable for telecommunications. Their unsuitability for medical laser applications is readily seen in Table A, which compares the fiber requirements for medicine and telecommunications.

TABLE A

Comparison of fiber optic requirements for the medical and telecommunications industries.

| Requirement | Medical | Telecommunications |
| --- | --- | --- |
| Loss | 1 dB/m | $1 \times 10^{-4}$ dB/m |
| Dispersion | Irrelevant | Must be zero |
| Flexibility | Excellent | Good |
| Toxicity | Must be zero | Irrelevant |
| Water solubility | Very low | Low |
| Strength | Very high | High |
| Peak power | $>10^5$ W/cm$^2$ | 10 W/cm$^2$ |
| Shelf life | 1–5 years | 50–100 years |
| Sterilizable | Vital | Irrelevant |
| Length | 1–3 m | >10 km |

Within the art of fiber optic glass compositions are found germanate glasses for mid-infrared window applications and for other optical elements. A large number of these germanate glasses contain one or more components, such as PbO, BaO, TeO$_2$, Sb$_2$O$_3$, or As$_2$O$_3$, that render them unsuitable for bio-interactive applications because of their toxicity. Other components added for melt stability or chemical durability shift the multi-phonon edge to shorter wavelengths, which limit the usable length and wavelength of fiber elements.

The present invention provides novel compositions of germanate glass optical fibers that the present state of the art is lacking in several essential areas: non-toxicity, low intrinsic loss, high laser damage threshold, and chemical, thermal, and mechanical stability. These germanate glasses are suitable for laser delivery from 2.5 to 3.0 µm.

OBJECTS AND SUMMARY OF THE INVENTION

An object of the invention is to provide glass compositions for germanate glass optical fibers for non-toxic medical laser applications.

Another object of the invention is to provide germanate glasses that are characterized by a high laser damage threshold, high chemical durability, and long shelf life and integrity when in contact with tissue during medical surgery.

A further object of the invention is to provide germanate glass compositions that are characterized by low intrinsic absorption in the laser wavelength range of 2.5–3.0 µm.

Still another object of the invention is to provide germanate glasses that allow useful transmission in the visible wavelength for an aim beam to be used during surgery.

The foregoing and other objects are achieved by a family of germanate glasses with certain thermal, optical, and chemical properties that make them particularly well suited for mid-infrared applications in medical laser delivery. Specifically, the present invention provides germanate glasses with the following criteria: non-toxicity, use of low concentrations of elements that absorb strongly in this wavelength range, and being composed of additional metal oxides that, when incorporated into the glass structure, the multi-phonon edge associated with the metal-oxide bond, M—O, is at wavelengths greater than that associated with tetrahedrally-coordinated Ge—O. The glasses have good thermal properties including low thermal expansion coefficient and high glass transition temperature.

BRIEF DESCRIPTION OF THE DRAWINGS

The foregoing and other objects will be more fully understood from the following detailed description and tables read in connection with the accompanying drawings, in which.

DETAILED DESCRIPTION OF THE PREFERRED EMBODIMENT

Figure 1:
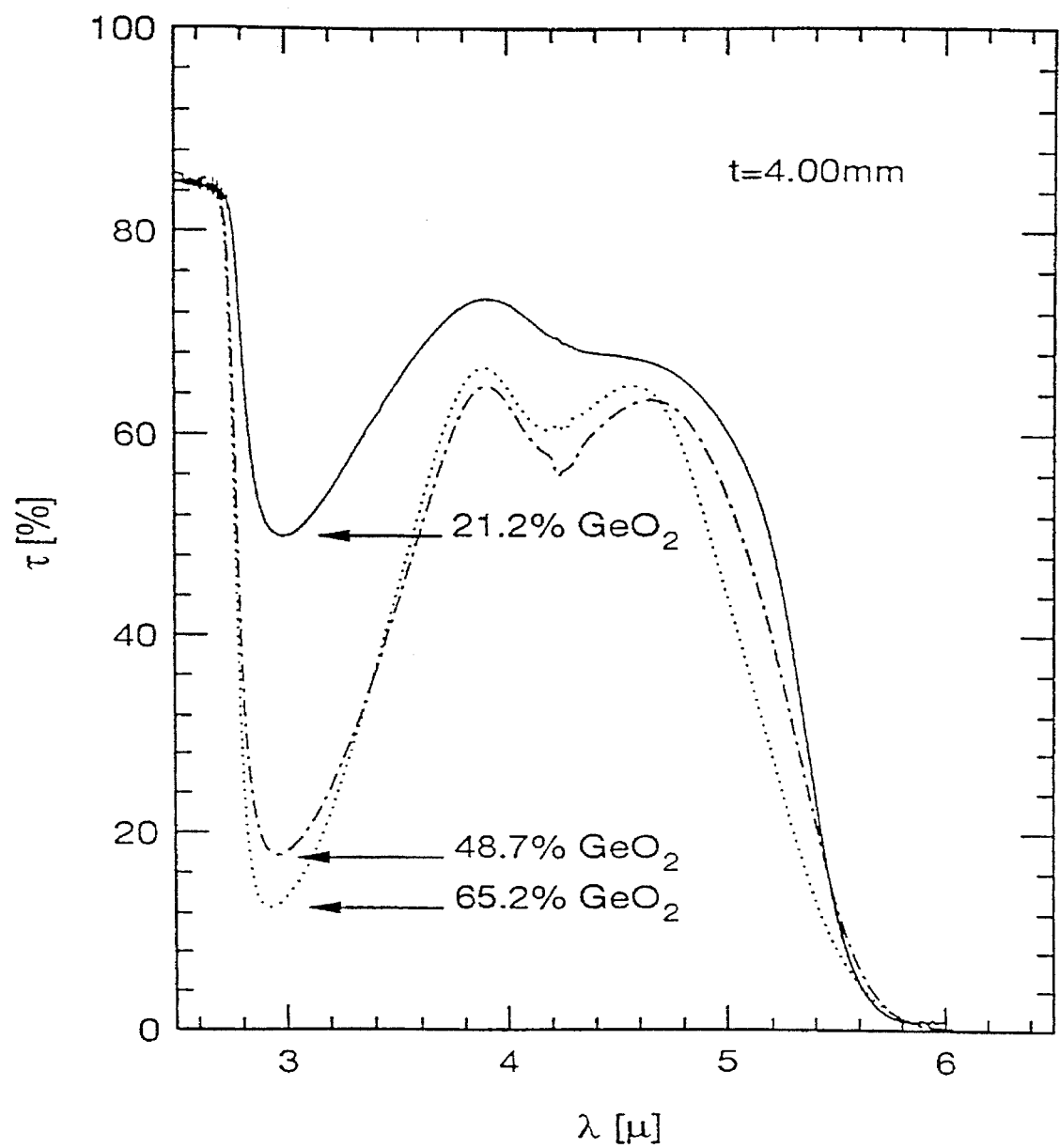
FIG. 1 is an infrared spectra of glasses with $[GeO_2]$=65.2, 48.7, and 21.2 cationic percentage and sample thickness normalized to 4.00 mm thickness.

The present invention is a set of optical fiber germanate glass compositions for the effective delivery of mid-infrared laser light that are non-toxic to humans and possess increased stability. One embodiment of the present invention is a non-toxic germanate glass with a high laser damage threshold and capable of transmitting an aim beam to direct the laser during invasive laser surgery. Some embodiments of the present invention provides several specific criteria for composing a family of non-toxic germanate glasses that are fiberizable and suitable for mid-infrared medical laser delivery systems. Other embodiments provide specific germanate glass compositions by percentage ranges for such short-haul applications. Improved bend radius and power handling capability are also important features of the present invention. Brief definitions of the criteria that determine the quality of optical fiber glass compositions for mid-infrared medical laser applications are as follows:

Bend radius is the minimum radius of curvature that a fiber can be subjected to without failure. A low bend radius for a given diameter of optical fiber is desired.

Linear expansion coefficient α(/°C.) is the incremental change in length of a unit length of material per degree Centigrade (°C.). α should be low for good thermal shock resistance.

Toxicity refers to those elements and combinations of elements from the Periodic Table of the Elements that display toxic properties. For invasive surgery, non-toxic materials for the optical fiber glass are desired.

Aim beam is used during laser surgery to see where the laser light is directed. The method which has proven itself most effective is to transmit low intensity visible light down the same fiber used for delivering the therapeutic laser. In order for this aim beam to be transmitted down the fiber, the glass must be sufficiently transparent at the visible aim beam wavelength, i.e., typically, lasers operating at 527, 632, and 660 nm.

Fiber drawing refers to one of a variety of established glass drawing techniques. Some halogenated polymers are sufficiently transparent near 3 µm to make them suitable for cladding fibers. The glass core of the fiber are drawn into a fiber by one of many methods: (1) pulling it from the surface of the molten glass; (2) extruding the fiber from the bottom of the crucible; or (3) producing a large diameter rod of glass called a preform which is locally heated up to a temperature sufficient to allow a stable stream of glass to be either pulled from or fall from the preform. This third method is the most common method used today for producing fibers for medicine and telecommunications. To produce glass clad fibers, a non-toxic glass with similar properties to the core glass but with a smaller index of refraction must be selected. The fibers are drawn using either the double crucible method or from a glass clad preform.

Visible transmission refers to the wavelength region from 380–780 nm having low absorption. Excellent visible transmission allows an aim beam to be used.

Total absorption coefficient (in $cm^{-1}$) is the result of attenuation due to intrinsic loss mechanisms, electronic transition and lattice vibration, and extrinsic losses due to impurities. It is also exponentially proportional to the transmission loss along the fiber length. A low total absorption coefficient is desirable.

Intrinsic absorption refers to those absorptions that are intrinsic to the glass and are a result of electronic transitions and multi-phonon resonance. At any wavelength, the transmission of radiation will be attenuated by these mechanisms which absorb radiation.

Extrinsic absorption refers to absorptions by those mechanisms which are extrinsic to the glass such as impurities. These impurities are either permanent (transition element and lanthanide oxides) or removable (water, hydrocarbons, gaseous species). At any wavelength, radiation will be attenuated by these mechanisms.

Glass transition temperature ($T_g$) is the temperature upon cooling at which there is deviation from the equilibrium volume–temperature line. In practice, $T_g$ is the intercept of the low-temperature and high-temperature thermal expansion curves. $T_g$ corresponds to approximately $10^{13.0}$P.

Softening point temperature ($T_s$) is the temperature at which a glass has a viscosity of $10^{7.6}$ Poise, where 1 Poise (P)=10 Pascal.second=1 g/cm.s. A high $T_s$ is desired.

Chemical durability in water $D_W$ (in g/cm$^2$.s) refers to the resistance offered by a glass towards attack by aqueous solutions and atmospheric agents. Low values are desired.

Liquidus temperature ($T_l$) refers to the temperature at which the glass melt, when cooled, becomes unstable and crystallizes. Low values are desired.

Viscosity ($\eta$) is defined as shear stress by strain rate.

Viscosity-temperature dependence refers to the dependence of viscosity to temperature. Viscosity has an exponential dependence on temperature given by $$\eta = \eta_0 e^{(-\frac{Q}{RT})}$$

where, $\eta_0$=pre-exponential factor,
Q=Activating energy for viscous flow,
R=gas constant,
T=temperature.

Because the slope of Log $\eta$ vs 1/T is approximately a straight line, low slope magnitudes correspond to low changes in viscosity with temperature. "Flatter" curves promote drawing of fibers with uniform properties.

Peak power is the energy of the laser pulse divided by the product of the fiber cross-sectional area and the full width at half maximum (FWHM) of the laser pulse. The glass optical fiber is more stable and desirable if it supports or handles higher laser pulse peak power.

Devitrification refers to the process by which an amorphous material is transformed by structural rearrangement into a crystalline state. A high resistance to devitrification is desired.

Non-Bridging Oxygen (NBO) refers to the oxygen that are bound to only one cation within the glass network.

Glass Formers are metal oxides that will form glasses if cooled from the melt. They must possess high single-bond strengths and relatively low coordination number (3–6).

Glass Modifiers are metal oxides or metal halides which cannot themselves form glasses, and are added to modify the glass.

Coordination Number is the number of anion composing the polyhedra around each cation.

Fiberizable refers to the ability of a glass to be drawn into a long length of uniform cross-section. The glass needs to be fairly viscous and the change in viscosity, at this temperature as a function of temperature should be small. The drawing temperature should preferably be above the liquidus temperature $T_l$.

Multi-phonon edge refers to the wavelength, in the infrared portion of the spectrum, at which metal-oxide bonds resonate. This resonance results in very high absorption coefficients at and around that wavelength. For good infrared transmission, the multi-phonon edge should be at as long a wavelength as possible. If the multiphonon edge is at a shorter wavelength, the absorptions are higher and thus detrimentally affect the transmission.

Fiber optic laser damage threshold (LDT) is the laser power density necessary to damage an optical fiber and is usually expressed in w/cm$^2$. The LDT depends on the average power, wavelength, and pulse duration of the laser. It also depends on the following properties of the glass fiber: surface finish, absorption of the fiber at the laser wavelength, thermal expansion coefficient $\alpha$, Elastic Modulus E, softening point temperature $T_g$, of the glass, and hardness H of the glass.

Because so many variables affect the LDT of the fiber, no accurate formula currently exists for calculating the LDT. However, the qualitative way that the physical, optical, and thermal properties of the glass affect the LDT is understood.

Several mechanisms which effect a fiber optic laser damage threshold exist. Impurities which absorb at the laser wavelength cause local heating which lead to localized spalling, melting, or vaporization. In order to prevent this damage mechanism, the concentration of both intrinsic and extrinsic absorbing impurities must be kept sufficiently low. Using sufficiently high purity starting materials, a crucible made from a material resistant to attack by the glass, and drying the glass will prevent this mechanism of fiber damage.

The glass must have high chemical resistance to hydroxyl (OH) attack. If the glass has poor resistance to hydroxyl attack the water will diffuse in and embrittle the glass. It also forms a highly absorptive layer on the surface of the fiber that easily damages when laser light is focused into the fiber.

The fiber must have a smooth surface finish in order to prevent light from scattering from the fiber surface and to prevent absorptive materials from adhering to the fiber. The harder the core glass, the easier it will be to achieve a good surface finish by either cleaving or polishing. A high Elastic Modulus is as important.

When the average power of the laser is too high, small absorptions in the fiber will cause the fiber to heat up. If the fiber heats up too much adhesives which bond the fiber to a connector and the fiber buffer will melt and the fiber will become too hot for use during surgical procedures. This is best prevented by keeping the glass absorption and the average power of the laser sufficiently low.

The high power densities associated with pulsed lasers cause rapid local heating of the fiber which sometimes lead to spalling, as well as local melting and vaporization. Because most medical applications use pulsed lasers, the fiber must be able to withstand 1 kW per square centimeter. To prevent this damage it is important that the fiber has low absorption at the laser wavelength, low thermal expansion coefficient, and high melting temperature.

When the pulsed lasers are used in conjunction with fibers for surgical contact cutting, powerful acoustical shockwaves result and fracture the fiber. These fractures produce chips of glass that remain in the human subject. To minimize such problems, the glass must not be too brittle. Under extreme conditions, even damage resistant materials such as quartz and sapphire fracture and leave small amounts of debris in the surgical field. Because this debris has such a high surface area to volume ratio, even glasses of high chemical durability will dissolve. Thus, toxic components of the glass are harmful to humans. Use of non-toxic components minimize such danger to the human subjects.

For high surface (input) damage threshold, a high Elastic Modulus E, a high hardness H, and a low chemical durability $D_W$ are desired. For thermal shock (distal) damage threshold, a low expansion coefficient $\alpha$ and a high glass transition temperature $T_g$ are desired. For high thermal (internal) damage threshold, low absorption (dB/cm) is desired.

The selection of the glass former is restricted to essentially GeO$_2$ and the modifiers to oxides of elements selected from the "restricted" periodic table as shown in Table B. GeO$_2$ is more water soluble than silica-based compositions but GeO$_2$ facilitates transmissions at wider wavelength ranges and at longer multi-phonon edges. Adding modifiers and stabilizers increase the stability and other critical properties of the GeO$_2$-based glass compositions that are superior to other glass compositions for medical applications. As is well known in the art, R is a variable to denote any metal element in the Periodic Table of the Elements.

TABLE B

Restricted periodic table for oxide modifiers.

| R+ | R++ | R+++ | R++++ | R+++++ | R++++++ |
|----|-----|------|-------|--------|---------|
| Li | Mg  | Y    | Ti    | Nb     | Mo      |
| Na | Ca  | La   | Zr    | Ta     | W       |
| K  | Sr  | Gd   | Hf    |        |         |
| Cs | Zn  | Yb   | Ce    |        |         |
|    |     | Ga   |       |        |         |
|    |     | Bi   |       |        |         |

The less desirable elements are underlined in Table B. Of these less desirable elements, Li is undesirable because of its toxicity. Alkali and Ca are undesirable because they lower chemical durability. Mo, W, Ce, and Bi tend to absorb strongly in the visible wavelength range.

The following elements are toxic to humans and should not be present in a glass fiber used for laser surgery: Li, Be, Ba, Cd, In, Tl, Pb, As, Sb, Cr, Ni, Te, and Se. Toxicity is an important issue because the glass-composed optical fiber containing the deliberately added toxic elements often chips off. These chips are produced because of the acoustical shockwaves resulting from the glass contacting the water in the tissue of the human subject. These chips of the fiber are left in the human subject during medical invasive laser surgery. If these chips are water soluble, their toxic property is harmful to humans. Additionally, the glass fiber sometimes breaks and portions are left in the human subject.

However, some elements, such as Fluorine, are toxic only if they are found in high dosages as listed by the Cal—OSHA and Merck indices. Fluorine's toxicity also changes when it is combined with other elements in compound form. When fluorine is found in a compound, the toxicity depends on the water solubility of the compound. The more water soluble the compound, the more likely that the compound is considered toxic if the dosage is high enough. The less water soluble the compound, the less likely that the compound is considered toxic.

In many glass compositions, small traces of toxic elements are also found. These toxic elements enter the composition as contaminants. However, these toxic elements do not significantly affect the quality and usefulness of the present non-toxic glass compositions. The present invention is concerned with deliberately not adding toxic elements to the novel glass compositions. The glass compositions of the present invention tolerate some unavoidable contaminants.

The oxides of the following elements limit the transmission of the fiber near 3 μm and should be kept as low as possible: B, Al, Si, P, H, Fe, Co, Ni, Cu, Ce, Pr, Nd, Sm, Eu, Tb, and Tin. The oxides of the following elements limit the fiber from transmitting a visible aim beam and should be kept sufficiently low: As, Cd, Bi, S, Se, Te, Mo, W, V, Cr, Mn, Re, Fe, Co, Ni, Cu, Pr, Nd, Ho, Er, and Tm. Other compounds that are radioactive or are liquid or gas at room temperature should be omitted. In one embodiment of the present invention, the $GeO_2$ compound is mixed with those allowable elements that are thus restricted to the oxides exhibiting non-toxicity, long wavelength fundamental absorption edge, short ultraviolet edge, low intrinsic absorption at the wavelength range of 2.5–3.0 μm, and desirable characteristics to the glass, such as stability with respect to devitrification, high glass transition temperature, chemical durability, and low thermal expansion coefficient. Table C shows that additional requirements for purity of the starting materials are imposed by the high absorption of energy by lanthanides, first row transition elements, and water. These elements in Table C are undesirable for the glass composition because of their high absorption. Water is removed subsequent to formation of the glass whereas the other components cannot. Therefore, the starting materials must be substantially free of these elements.

TABLE C

Absorption coefficients of undesirable contaminants at 3.0 μm.

| Element | Absorption in dB/km · ppm |
|---------|---------------------------|
| Fe      | 2.0                       |
| Co      | 4.0                       |
| Ni      | 0.5                       |
| Cu      | 0.01                      |
| Ce      | 7.7                       |
| Pr      | 0.4                       |
| Nd      | 0.6                       |
| Sm      | 5.6                       |
| Eu      | 3.1                       |
| Tb      | 14.3                      |
| Dy      | 8.3                       |
| OH      | ~10000.0                  |

In one embodiment, small amounts of stabilizing components that absorb more strongly than $GeO_2$ at the wavelength range 2.5–3.0 μm are added if the total absorption is not drastically increased. Therefore, $Al_2O_3$, $SiO_2$, and less desirably $B_2O_3$ and $P_2O_5$ are, in certain embodiments, added to stabilize the glass, as long as the total attenuation, due to intrinsic and extrinsic mechanisms is kept below some specified value, such as 3.01 dB/km.ppm.

The following discussion is intended to illustrate the scientific rationale for the selection of glasses to meet the stringent medical application requirements. $GeO_2$ with the addition of modifying oxides forms a superb set of glasses for the stated application in medical surgery. To this end, glasses in the strontium gallium germanate system (SrO—$Ga_2O_3$—$GeO_2$) are used for non-toxicity, increased stability, high laser damage threshold, and ability to use an aim beam.

To study this glass system, compositions within the $GeO_2$—$Ga_2O_3$—SrO system were chosen with $[GaO_{1.5}]/[SrO]=1.0$ and 2.0. Results are shown in Table D. Although the generic oxide modifiers ($R_nO_m$) are listed, Table D does not does not add any. These oxide modifiers are added later. They are shown in the heading of Table D to indicate that any acceptable oxide modifier can be added if desired.

TABLE D

Glasses and properties in the SrO—Ga$_2$O$_3$—GeO$_2$ embodiment.

| Composition [mol %]<br>GeO$_2$—Ga$_2$O$_3$—SrO—(R$_n$O$_m$) | [GaO$_{1.5}$]/<br>[SrO] | T$_g$<br>[°C.] | T$_s$<br>[°C.] | α<br>[/°C.](× 10$^{-7}$) | D$_w$<br>[mg/cm$^2$ · h]) |
|---|---|---|---|---|---|
| 100.0-0.0-0.0 | — | 545.0 | — | 69.8 | >300.0 |
| 88.75-3.75-7.5 | 1.0 | 614.0 | 687.0 | 65.2 | 20.0 |
| 85.0-5.0-10.0 | 1.0 | 618.0 | 675.0 | 62.9 | 15.9 |
| 81.25-6.25-12.5 | 1.0 | 626.0 | 684.0 | 58.9 | — |
| 77.5-7.5-15.0 | 1.0 | 633.0 | 684.0 | 59.8 | 13.1 |
| 73.75-8.75-17.5 | 1.0 | 653.0 | 703.0 | 61.2 | 12.0 |
| 70.0-10.0-20.0 | 1.0 | 653.0 | 703.0 | 62.8 | 13.6 |
| 62.5-12.5-25.0 | 1.0 | 663.0 | 712.0 | 64.7 | 11.0 |
| 88.75-5.625-5.625 | 2.0 | 608.0 | 676.0 | 65.4 | — |
| 85.0-7.5-7.5 | 2.0 | 619.0 | 681.0 | 60.0 | — |
| 81.25-9.375-9.375 | 2.0 | 628.0 | 682.0 | 60.5 | — |
| 77.5-11.25-11.25 | 2.0 | 647.0 | 708.0 | 58.8 | — |
| 73.75-13.125-13.125 | 2.0 | 644.0 | 714.0 | 57.8 | 10.9 |
| 70.0-15.0-15.0 | 2.0 | 651.0 | 709.0 | 60.5 | 8.7 |
| 66.25-16.875-16.875 | 2.0 | 661.1 | 720.0 | 59.7 | 8.5 |
| 62.5-18.75-18.75 | 2.0 | 675.0 | 727.0 | 61.5 | — |
| 58.75-20.625-20.625 | 2.0 | 678.0 | 734.0 | 63.0 | 6.3 |

Glasses were made in the following traditional manner. The raw batch materials are combined and mixed. They are melted at 1400°–1700° C. (depending on composition) in Platinum-rhodium or Iridium crucibles. The melt is stirred and sometimes bubbled with dry gas. The melt is cast into a graphite mold and annealed at a temperature above T$_g$. The cast glass is held for at least 30 minutes and slow cooled at approximately 2° C./min to at least 50° C. below T$_g$, and cooled at approximately 10° C./min to room temperature.

Samples were prepared from annealed glass. For spectroscopy, the glass was ground and polished both sides to within 0.02 mm parallel. For chemical durability, the samples were ground and polished both sides and fabricated into a regular geometry to allow accurate measurement of the total surface. For α, T$_g$, and T$_s$, a thin rod of approximately 0.5 cm×19 mm was prepared. For T$_l$, several grams of glass were melted, cooled to a temperature above T$_s$ and held for 30 minutes prior to rapidly cooling and examining under low magnification for crystallization.

Pure GeO$_2$ glass

All embodiments of the present invention are based on GeO$_2$. When combined with modifiers, it provides increased stability, visible transmission of an aim beam, and, if toxic elements are not deliberately added, non-toxicity for medical laser surgery applications.

A pure GeO$_2$ melt was prepared so as to be able to measure α, T$_g$, T$_s$ and D$_W$. The value measured for α, 69.8×10$^{-7}$/°C., compares favorably with the reported values of 65.0–77.0×10$^{-7}$/°C. T$_g$ was measured as 545.0° C., slightly higher than the reported values that span from 500°–535° C. The pure GeO$_2$ glass was extremely soluble in boiling water, with D$_W$>300.0 mg/cm$^2$.s.

SrO—Ga$_2$O$_3$—GeO$_2$ melts

Another embodiment of the present invention is based on the ternary combination of SrO—Ga$_2$O$_3$—GeO$_2$. This embodiment provides increased glass stability, high laser damage threshold, visible transmission, and non-toxicity.

The change in α, T$_g$, T$_s$ and D$_W$ as a function of GeO$_2$ content is shown in Table D. With decreasing GeO$_2$, α decreases initially and then sharply increases with further substitution. This trend is readily seen for the data corresponding to [GaO$_{1.5}$]/[SrO]=1.0. T$_g$ and T$_s$ increase with decreasing GeO$_2$ for each given ratio [GaO$_{1.5}$]/[SrO]. But the difference T$_s$–T$_g$ decreases for [GaO$_{1.5}$]/[SrO]=1.0 and remains relatively constant for [GaO$_{1.5}$]/[SrO]=2.0. The chemical durability D$_W$, improves with decreasing GeO$_2$. No appreciable difference in the infrared spectra of these glasses exists.

Thus, certain properties (α, T$_g$, and D$_W$) improve with substitution of GeO$_2$ without any noteworthy change in the infrared spectra. A compositional range exists where the improvement in α and T$_s$–T$_g$ are the greatest. This range corresponds to the set of data for [GaO$_{1.5}$]/[SrO]=2.0, which is further studied in the next set of melts, and hence, the next set of embodiments of the present invention.

SrO—Ga$_2$O$_3$—GeO$_2$—R$_n$O$_m$ melts

Adding appropriate modifiers R$_n$O$_m$ improves the stability of the germanate glass compositions for use as short-haul optical fibers, in accordance with this invention. Stability improves with high laser damage threshold, low absorption coefficient at the laser wavelength, high glass transition temperature (T$_g$), low expansion coefficient (α), high softening temperature (T$_s$), high chemical durability in water characterized by low values of D$_W$, low liquidus temperature (T$_l$), small temperature dependence of viscosity in the fiber drawing temperature region, and a strong resistance to devitrification. The embodiments to follow discuss various specific modifiers R$_n$O$_m$, that were used and the improved results obtained. None of the modifiers R$_n$O$_m$ are toxic, thus maintaining the non-toxic nature of these novel germanate glass compositions.

Based on these measurements a glass with [GaO$_{1.5}$]/[SrO] =2.0 and [GeO$_2$]=65.5 cationic percent was selected as the centroid composition to which the fourth component was incrementally added. The fourth component was added to increase stability. RO-type oxides were substituted in place of SrO in the centroid glass. RO$_2$, RO$_3$, R$_2$O$_3$ and R$_2$O$_5$-type oxides were substituted on a cationic basis for SrO and Ga$_2$O$_3$ such that [GaO$_{1.5}$]/[SrO]=2.0. Selected properties were measured on those compositions which formed stable glasses. The results are shown in Tables E through I.

R$_n$O$_m$=Ta$_2$O$_5$

Figure 4:
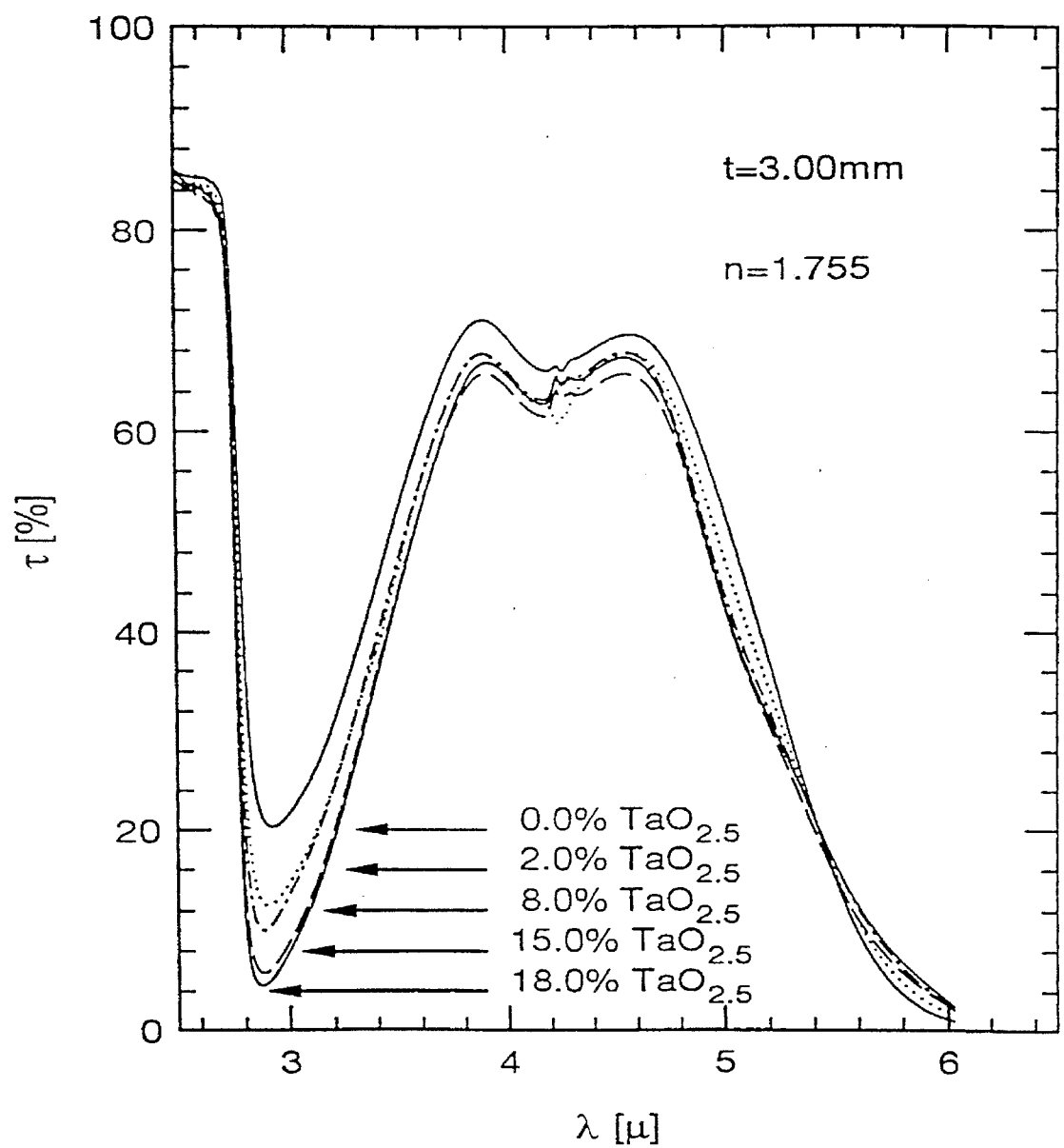
FIG. 4 is an infrared spectra of the germanate glass composition where $R_nO_m$=$Ta_2O_5$.

In accordance with this invention, glasses with high percentages of Ta$_2$O$_5$ have excellent properties, as shown in Table E. The expansion coefficient decreases to a very low value, thus increasing the stability of this germanate glass composition. In fact, these expansion coefficients are the lowest ever reported for germanate glasses. Correspondingly, T$_g$ and T$_s$ increase with Ta$_2$O$_5$ content. The value of T$_s$–T$_g$ also increases with Ta$_2$O$_5$ content, indicating that the slope of the viscosity versus inverse temperature curve is becoming less negative. A higher absolute viscosity and a longer working range were clearly manifest in the hand melts. Further corroboration of the increasing viscosity of the melts is shown in FIG. 4, where the infrared spectra of these glasses shows a pronounced increase in melt viscosity with increasing $TaO_{2.5}$, which exhibit increased residual $OH^-$, clearly indicating an increasing barrier to diffusion. Table E also shows the expected increase in chemical durability imparted by $Ta_2O_5$.

In another embodiment, $Y_2O_3$ was added to the $GeO_2$—$Ga_2O_3$—SrO ternary system. Results are shown in Table G. $Y_2O_3$ additions, as with $Ta_2O_5$ and $Nb_2O_5$, increase $T_g$, $T_s$ and $T_l$, and improves chemical durability greatly, but the difference $T_s$–$T_g$ decreases with increasing $Y_2O_3$.

As shown in the actual experimental results of Table F, in accordance with this invention, the effect was quite apparent in the hand melts where increasing $Y_2O_3$ led to increasing melt fluidity and a tendency to crystallize. This decrease in

TABLE E

Glasses and properties in the SrO—$Ga_2O_3$—$GeO_2$—$Ta_2O_5$ embodiment.

| Composition [mol %] $GeO_2$—$Ga_2O_3$—SrO—($Ta_2O_5$) | $T_g$ [°C.] | $T_s$ [°C.] | α [/°C.] (× $10^{-7}$) | $D_w$ [mg/cm² · h] | $T_l$ [°C.] |
|---|---|---|---|---|---|
| 73.75-13.125-13.125-0.0 | 644.0 | 714.0 | 55.2 | 10.9 | 950.0 |
| 74.3-12.3,12.3-1.1 | 642.0 | 705.0 | 48.6 | 4.5 | 1140.0 |
| 74.6-11.6-11.6-2.3 | 652.0 | 711.0 | 48.0 | 3.1 | 1140.0 |
| 75.1-10.1-10.1-4.6 | 657.0 | 727.0 | 44.5 | 0.70 | 1090.0 |
| 75.7-8.7-8.7-6.9 | 665.0 | 744.0 | 40.5 | 0.75 | 1080.0 |
| 76.2-7.6-7.6-8.7 | 668.0 | 744.0 | 43.9 | 0.47 | 1160.0 |
| 76.6-6.4-6.4-10.5 | 671.0 | 765.0 | 36.0 | 0.44 | 1280.0 |
| 77.1-5.3-5.3-12.4 | 683.0 | 773.0 | — | 0.76 | 1330.0 |
| 77.5-4.1-4.1-14.2 | 682.0 | 770.0 | 37.7 | — | — |
| 78.0-3.0-3.0-16.0 | — | — | — | — | — |
| 72.5-8.4-16.9-2.2 | 650.0 | 721.0 | 52.5 | 2.4 | 1125.0 |
| 74.8-5.6-11.1-8.6 | 697.0 | 764.0 | 42.2 | 0.25 | 1140.0 |
| 75.7-13.2-8.8-2.3 | 660.0 | 713.0 | 58.3 | 3.3 | 1150.0 |
| 76.9-8.6-5.7-8.8 | 667.0 | 750.0 | 41.8 | 0.54 | 1180.0 |

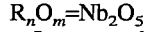

In yet another embodiment, a different modifier, $Nb_2O_5$, was added to the germanate glass to increase stability. Results of the measured properties are shown in Table F.

In accordance with this invention, the effect of $Nb_2O_5$ addition on α, $T_g$, $T_s$ and $T_l$ is surprisingly not coincident with $Ta_2O_5$, as shown in Table F. The trends are similar but the magnitude of the change is substantially diminished. The decrease in α with $Nb_2O_5$ increase is much less than with $Ta_2O_5$. $T_g$ and $T_s$ decrease slightly and $T_s$–$T_g$ is nearly constant with $Nb_2O_5$ in contrast to the increase seen with $Ta_2O_5$. Both $Nb_2O_5$ and $Ta_2O_5$ additions lead to a rapid rise in $T_l$, but the effect is substantially reduced with $Nb_2O_5$. The increase in chemical durability is similar to that seen with $Ta_2O_5$. At high levels of $Ta_2O_5$ and $Nb_2O_5$ the glass exhibited a slight degree of phase separation upon cooling or reheating. For $Ta_2O_5$ this limit was around 27.0 cationic %, and for $Nb_2O_5$ around 18.0 cationic %. Tables E and F show the change in α, $T_g$, $T_s$, chemical durability, and $T_l$ with the additions of $Ta_2O_5$ and $Nb_2O_5$, respectively.

structural stability was also manifest in the increasing value of α. Yttria containing glasses did exhibit one additional noteworthy behavior; fibers with high $Y_2O_3$ content exhibited extremely small bend radii, less than 1 cm for a 500 μm diameter fiber. This is an improvement over coated fluoride fibers which have bend radii of 5–20 cm for a fiber diameter of 500 μm.

Fibers drawn fresh from a melt are pristine, but almost immediately they degrade due to exposure to water in the atmosphere. This exposure facilitates corrosion at crack tips, and thus accelerating failure under load. Yttria arrests this process by two mechanisms: it ties up NBO's and forms a highly insoluble hydroxide. Table G shows the change in α, $T_g$, $T_s$, chemical durability, and $T_l$ with the addition of $Y_2O_3$.

TABLE F

Glasses and properties in the SrO—$Ga_2O_3$—$GeO_2$—$Nb_2O_5$ embodiment.

| Composition [mol %] $GeO_2$—$Ga_2O_3$—SrO—($Nb_2O_5$) | $T_g$ [°C.] | $T_s$ [°C.] | α [/°C.] (× $10^{-7}$) | $D_w$ [mg/cm² · h] | $T_l$ [°C.] |
|---|---|---|---|---|---|
| 73.75-13.125-13.125-0.0 | 644. | 714. | 55.2 | 10.9 | 950.0 |
| 74.6-11.6,11.6-2.3 | 645. | 706. | 51.6 | 3.3 | 970.0 |
| 75.1-10.1-10.1-4.6 | 644. | 703. | 52.2 | 3.4 | 999.0 |
| 76.2-7.6-7.6-8.7 | 649. | 706. | 53.1 | 0.54 | 1040.0 |

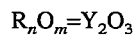

TABLE G

Glasses and properties in the SrO—$Ga_2O_3$—$GeO_2$—$Y_2O_3$ embodiment.

| Composition [mol %]<br>$GeO_2$—$Ga_2O_3$—SrO—($Y_2O_3$) | $T_g$ [°C.] | $T_s$ [°C.] | α [/°C.]<br>(× $10^{-7}$) | $D_w$ [mg/cm² · h] | $T_l$ [°C.] |
|---|---|---|---|---|---|
| 73.75-13.125-13.125-0.0 | 644.0 | 714.0 | 55.2 | 10.9 | 950.0 |
| 74.2-12.5,12.5-0.8 | 667.0 | 722.0 | 54.5 | 7.7 | 965.0 |
| 74.4-11.9-11.9-1.7 | 664.0 | 732.0 | 54.9 | 3.7 | 980.0 |
| 74.7-11.2-11.2-2.9 | 686.0 | 735.0 | 50.0 | 2.2 | 995.0 |
| 75.1-10.3-10.3-4.3 | 705.0 | 761.0 | 58.9 | 1.6 | 1320.0 |
| 75.4-9.4-9.4-5.8 | 697.0 | 745.0 | 58.3 | 0.57 | 1350.0 |
| 75.1-8.5-8.5-7.2 | 700.0 | 758.0 | 60.9 | 0.24 | >1350.0 |
| 50.0-12.5-20.0-17.5 | 774.0 | 831.0 | 67.1 | 0.005 | — |
| 50.0-15.0-17.5-17.5 | — | — | — | 0.008 | — |
| 50.0-17.5-15.0-17.5 | 768.0 | 820.0 | 70.1 | 0.008 | — |
| 50.0-20.0-12.5-17.5 | — | — | 61.6 | 0.002 | — |
| 55.0-18.0-11.25-15.75 | — | — | — | 0.003 | — |
| 40.0-24.0-15.0-21.0 | 777.0 | 830.0 | 62.2 | — | — |
| 66.7-19.1-0.0-14.3 | 764.0 | 818.0 | 59.3 | 0.002 | — |

$R_nO_m$=ZnO and MgO

In this set of embodiments, ZnO and MgO were substituted for SrO in the basic ternary germanate glass system. In accordance with this invention, as shown in Table H, ZnO and MgO impart some beneficial character to the germanate glass of the present invention, but to a much lesser extent than the previous oxides discussed. Additionally, their solubility is somewhat limited, on a mol % basis of substitution for SrO. ZnO and MgO improve chemical durability, with ZnO exhibiting a greater effect. ZnO additions for SrO increase the density of the glass to the same extent as $Ta_2O_5$ additions. Since Zinc has a smaller atomic mass than Strontium the implication is that ZnO tightens the structure. $Zn^{2+}$ assumes a coordination number of 2 in some instances instead of the usual value of 4, linking structural units together. ZnO lowers α while MgO shows little influence on α. ZnO lowers $T_g$ and $T_s$ while MgO increases both. Both oxides increase $T_l$ rapidly. Refer to Table H.

present invention because of its detrimental effect on aim beam transmissions.

In accordance with the present invention, $TiO_2$ additions caused some increase in stability as the results tabulated in Table I show that α increased, $T_g$ and $T_s$ decreased, and $T_l$ increased. All these trends suggest that the $Ti^{4+}$ is partially octahedrally coordinated in these glasses. Although it has a beneficial effect on durability, it tends to color glasses yellow and thus intrudes upon the aim beam signal.

$ZrO_2$ improves chemical durability. An interpretation of the other property trends is somewhat complicated by the low solubility of $ZrO_2$ in the centroid glass. The change in α, $T_g$, $T_s$ and density with increasing $ZrO_2$, which all tend to indicate a more open structure evolving, correspond to an observed dramatic increase in melt fluidity. $ZrO_2$ is depolymerizing the structure to a great extent.

TABLE H

The effect of ZnO and MgO addition for SrO.

| Composition [mol %]<br>$GeO_2$—$Ga_2O_3$—SrO—($R_nO_m$) | $T_g$ [°C.] | $T_s$ [°C.] | α [/°C.]<br>(× $10^{-7}$) | $D_w$ [mg/cm² · h] | $T_l$ [°C.] |
|---|---|---|---|---|---|
| 73.75-13.125-13.125-0.0 | 644.0 | 714.0 | 55.2 | 10.9 | 950.0 |
| 74.0-13.0-10.9-1.1(ZnO) | 635.0 | 696.0 | 57.4 | 4.3 | 1070.0 |
| 74.0-13.0-10.7-2.3(ZnO) | 639.0 | 703.0 | 50.5 | 4.7 | 1170.0 |
| 74.0-13.0-9.6-3.4(ZnO) | 634.0 | 700.0 | 50.7 | 4.0 | 1190.0 |
| 74.0-13.0-4.5-8.5(ZnO) | — | — | — | 4.4 | — |
| 74.0-13.0-10.7-2.3(MgO) | 652.0 | 711.0 | 51.0 | 7.9 | — |
| 74.0-13.0-8.5-4.5(MgO) | 651.0 | 714.0 | 54.7 | 7.0 | — |
| 74.0-13.0-6.2-7.8(MgO) | 651.0 | 710.0 | 55.0 | 6.0 | — |
| 74.0-13.0-4.0-9.0(MgO) | 669.0 | 735.0 | 53.2 | — | — |

$R_nO_m$=$TiO_2$; $ZrO_2$; and $CeO_2$

In this study, $TiO_2$, $ZrO_2$ and $CeO_2$ were added to the centroid germanate glass to determine their effect on stability and usefulness (e.g., aim beam). Results are shown in Table I. $ZrO_2$ has rather limited solubility in this embodiment, whereas $TiO_2$ is quite soluble. $CeO_2$ was added to one melt, but the resulting glass was colored dark brown. Thus, $CeO_2$ is not useful to the germanate glass composition of the $CeO_2$ is not a good choice of an additive if an aim beam is to be used. Although, $CeO_2$ improves chemical durability greatly, it absorbs in the visible wavelength range, and it absorbs strongly at approximately 3.5 μm. Table I shows the results of these additions.

In sum, $TiO_2$ and $ZrO_2$ are used in some embodiments of the novel germanate glass compositions in a limited manner. Their stability enhancing qualities outweigh any drawbacks.

TABLE I

The effect of addition of $TiO_2$, $ZrO_2$ and $CeO_2$.

| Composition [mol %]<br>$GeO_2$—$Ga_2O_3$—SrO—($R_nO_m$) | $T_g$ [°C.] | $T_s$ [°C.] | $\alpha$ [/°C.]<br>($\times 10^{-7}$) | $D_w$ [mg/cm² · h] | $T_l$ [°C.] |
|---|---|---|---|---|---|
| 73.2-11.7-11.7-3.4($TiO_2$) | 642. | 698. | 57.0 | 4.5 | 975.0 |
| 72.4-10.5-10.5-6.6($TiO_2$) | 641. | 702. | 54.3 | 2.9 | 1130.0 |
| 71.6-9.3-9.3-9.8($TiO_2$) | 653. | 705. | 54.8 | 1.3 | 1225.0 |
| 70.8-8.1-8.1-13.0($TiO_2$) | — | — | — | — | — |
| 73.4-12.2-12.2-2.2($ZrO_2$) | 675. | 725. | 52.0 | 2.2 | 970.0 |
| 72.9-11.3-11.3-4.5($ZrO_2$) | 660. | 722. | 51.3 | 0.7 | 1320.0 |
| 73.2-11.7-11.7-3.4($CeO_2$) | — | — | — | 4.1 | — |

$R_nO_m$=$WO_3$

In another study, $WO_3$ was added to the centroid germanate-glass because it transmits well at 3 μm, is a conditional glass former, and should in theory tie up NBO's better than any oxide addition on a mol % basis. Unfortunately it is strongly colored being nearly black in thick sections. Thus, their effect on the aim beam is detrimental to the delivery system.

SrO—ZnO—$Ga_2O_3$—$Y_2O_3$—$Ta_2O_3$—$GeO_2$ melts

In this set of embodiments, a series of melts were made with $TaO_{2.5}$, $YO_{1.5}$ and ZnO added to glasses with the same value of [$GaO_{1.5}$]/[SrO] but with lower concentrations of $GeO_2$. In this way glasses with superb chemical, physical, thermal and optical properties were prepared. The behavior of the $R_nO_m$ additions at higher $GeO_2$ content is consistent with $R_nO_m$ additions at lower $GeO_2$ content. Table J gives the composition of these melts as well as measured values for $\alpha$, $T_g$, $T_s$, $T_l$ and chemical durability. K2, K3, K5 and K6 are melt numbers. Based on this series of melts large melts of glass designated K5 were prepared. Melts were bubbled with dry oxygen for 16 hours, and cast into plates. One plate was polished for chemical durability measurements. The other plate was cut up into pieces for crystallization stability measurements. The durability value $D_W$ is listed in Table J, and the results of the crystallization study are presented as a time-temperature-transformation diagram, (TTT), in FIG. 1. The TTT diagram illustrates that the glass designated K5 is quite stable with respect to devitrification. Table J suggests that K5 is suitable for fiber drawing.

Glasses based on composition melt K5 were calculated to have approximately 7.5 ppm $OH^-$ (based on the spectra and an accepted value for water absorption of 10 dB/m.ppm). For a fiber at 2.69 μm, a 1 meter length fiber will transmit more than 47% of the radiation.

TABLE J

Composition and selected properties of
SrO—ZnO—$Ga_2O_3$—$Y_2O_3$—$Ta_2O_3$—$GeO_2$ melts. (cationic %)

| OXIDE/MELT | K2 | K3 | K5 | K6 |
|---|---|---|---|---|
| $GeO_2$ | 52.51 | 52.51 | 52.51 | 52.51 |
| SrO | 6.21 | 6.21 | 5.00 | 4.40 |
| ZnO | 1.60 | 1.60 | 2.00 | 1.76 |
| $GaO_{1.5}$ | 15.63 | 15.63 | 14.00 | 12.33 |
| $YO_{1.5}$ | 8.02 | 4.01 | 4.00 | 4.00 |
| $TaO_{2.5}$ | 16.03 | 20.04 | 22.50 | 25.00 |
| $\alpha$ [/°C.] $\times 10^{-7}$ | 43.19 | 40.03 | 36.80 | 38.78 |
| $T_g$ [°C.] | 712.9 | 706.1 | 705.4 | 709.0 |
| $T_s$ [°C.] | 779.7 | 777.9 | 777.6 | 789.9 |
| $D_w$ ($\times 10^{-10}$) [g/cm² · s] | 8.89 | 1.74 | <0.16 | <1.33 |

Figure 2:
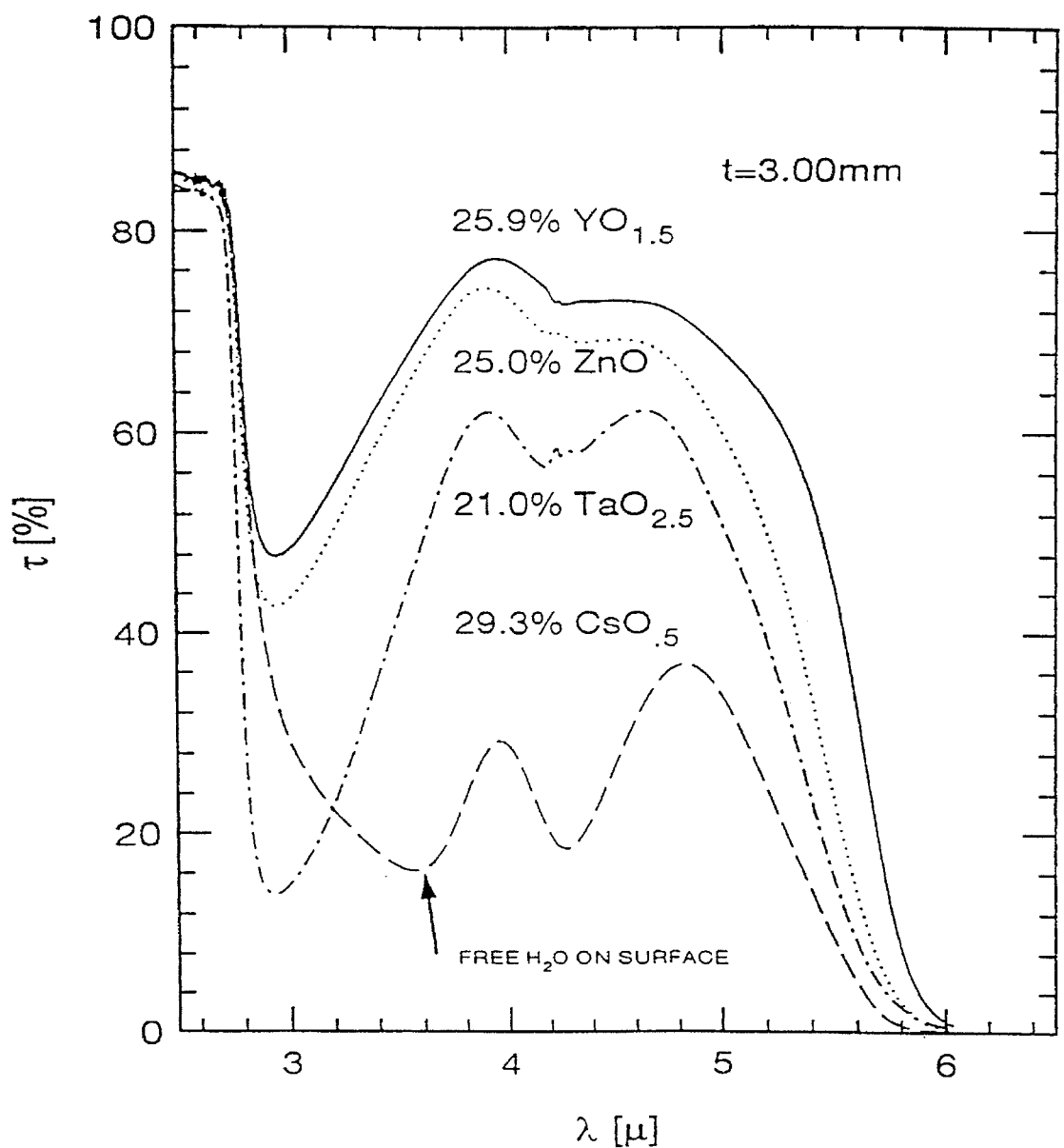
FIG. 2 is an infrared spectra of germanate glasses with large percentages of $R_nO_m$-type oxides.

In the applicants' laboratory, low $GeO_2$ glasses were stabilized in the SrO—$Ga_2O_3$—Nb(Ta)$_2O_5$—$GeO_2$ embodiment. Glasses with 25.0 mol % $GeO_2$ were made in 50 gram batches at conventional cooling rates, although glasses with $GeO_2$ content from 27.5 to 30.0 mol % were even more stable, such that fibers have readily been drawn from the melt. The test results in accordance with the present invention show that in contrast to the glasses based on 65.5 cationic % $GeO_2$, the low $GeO_2$ glasses which contained $Nb_2O_5$ were more stable than the low $GeO_2$ glass which contained $Ta_2O_5$. The fact that $GeO_2$ increases melt viscosity, and therefore inhibits $OH^-$ removal, is seen clearly in FIG. 2 where the intensity of the 3 μm $OH^-$ is noticeably reduced for low $GeO_2$ glasses.

These glasses represent the lowest content germanate glasses reported to date known to the applicants that have been formed under moderate cooling rates. Samples of these glasses formed in the laboratory were of good chemical durability and high $T_l$.

Additional melts

Figure 3:
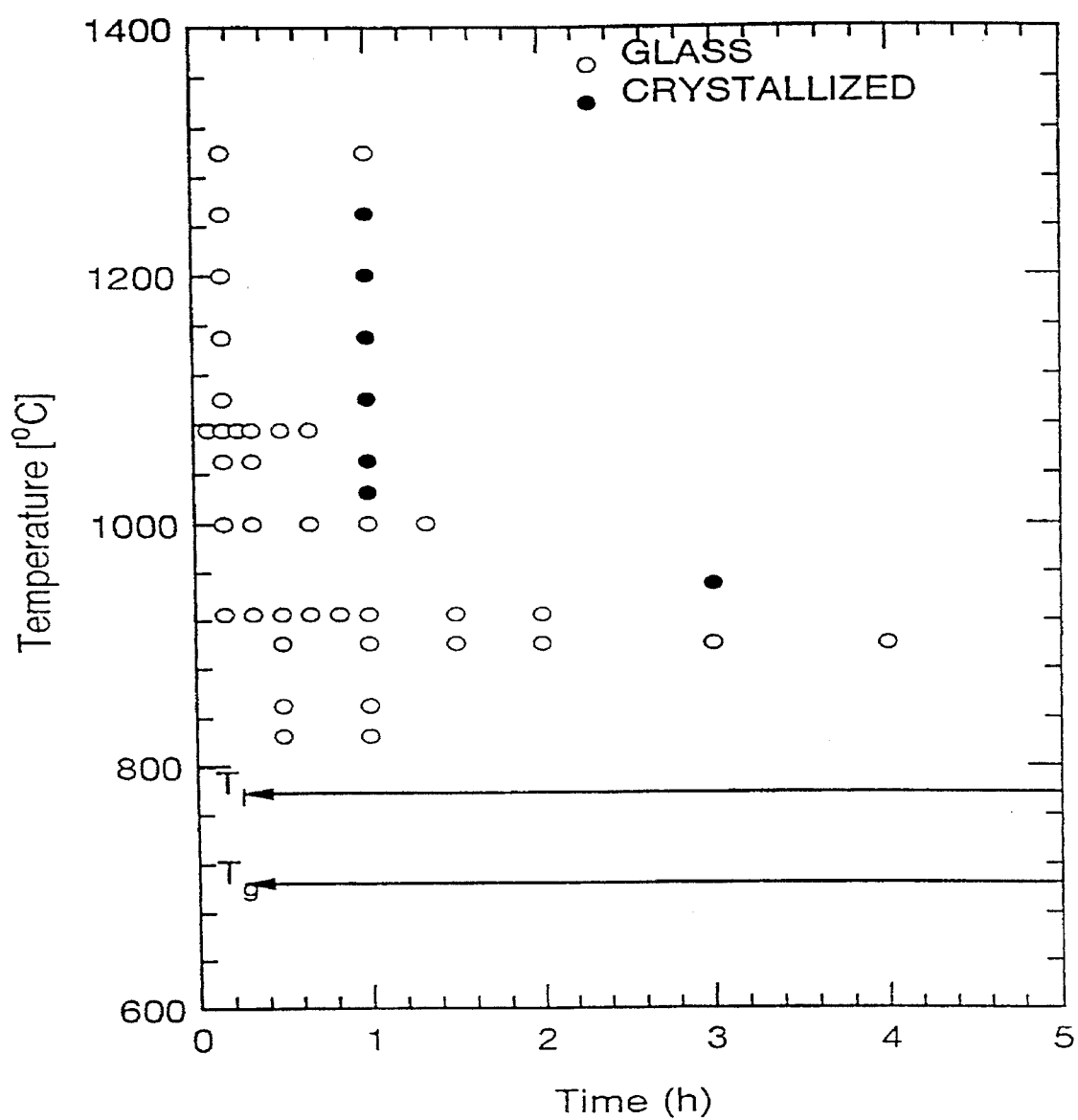
FIG. 3 is a time-temperature transformation diagram for crystal formation in a $Ta_2O_5$—$ZnO$—$SrO$—$Ga_2O_3$—$GeO_2$ glass.

Over 200 melts based on germania were made in the laboratory, and many of them were of excellent quality, showing no mass loss after 500 hours in boiling water. Infrared transmission and chemical durability were measured on most of these glasses and thermal properties on selected others. A few which exhibited no weight loss after more than 500 hours in boiling water, are included in Table K. Additionally, FIG. 3 shows the differing spectra that result when high percentages of $Cs_2O$, ZnO, $Y_2O_3$ or $Ta_2O_5$ are added. As noted in FIG. 3, high $Cs_2O$ glasses are readily attacked by atmospheric water, resulting in this characteristic signature from 3-4 μm.

TABLE K

Additional germanate glasses which exhibited no mass loss after 500 h in boiling water. Composition in cationic %.

| Oxide/Melt | N17 | C3 | D15 | D17 | D23 | D28 | D29 | D31 | D32 | D33 |
|---|---|---|---|---|---|---|---|---|---|---|
| $GeO_2$ | 35.0 | 50.0 | 27.6 | 33.3 | 39.3 | 39.3 | 39.3 | 39.3 | 39.3 | 37.2 |
| $TiO_2$ | — | — | — | 3.7 | 3.6 | 3.6 | 3.6 | 3.6 | 3.6 | 3.4 |
| $ZrO_2$ | — | 5.0 | — | — | — | — | — | — | — | — |
| SrO | — | 10.3 | 11.1 | 3.7 | — | — | — | — | — | — |
| ZnO | 10.0 | 25.0 | — | — | — | — | — | — | — | — |
| $GaO_{1.5}$ | 25.0 | 10.0 | 33.1 | 25.9 | 35.7 | 33.9 | 33.9 | 32.1 | 28.6 | 30.4 |
| $YO_{1.5}$ | — | — | 29.0 | 26.0 | 21.4 | 20.4 | 20.4 | 19.3 | 17.1 | 18.2 |
| $LaO_{1.5}$ | — | 10.0 | — | — | — | — | — | — | — | — |
| $GdO_{1.5}$ | 20.0 | — | — | — | — | — | — | — | — | — |
| $NbO_{2.5}$ | — | — | — | — | — | 2.8 | — | — | 11.4 | — |
| $TaO_{2.5}$ | 10.0 | — | — | — | — | — | 2.8 | 5.7 | — | 10.8 |

The germanate glasses of this invention have been routinely formed by combining the appropriate quantities of ingredients, (oxide, carbonates, hydroxides, fluorides, chlorides, etc.), mixing, and melting at temperatures sufficient to transform the raw batch into a homogeneous melt. To facilitate the melting and the removal of the water, the melt is stirred and bubbled. Furthermore, the melt is formed in a controlled atmosphere. The samples are cast into a mold, annealed to remove stresses, and fibers then drawn from this preform. Alternatively, fibers are drawn from the melt. The cladding is not restricted to glass.

The intrinsic losses are due to glass formers ($GeO_2$, $SiO_2$, $B_2O_3$, $P_2O_5$) and glass modifiers ($Li_2O$, $Na_2O$, $K_2O$, $Cs_2O$, MgO, CaO, SrO, ZnO, $TiO_2$, $ZrO_2$, $HfO_2$, $Y_2O_3$, $La_2O_3$, $Gd_2O_3$, $Yb_2O_3$, $Ga_2O_3$, $Al_2O_3$, $Bi_2O_3$, $Nb_2O_5$, $Ta_2O_5$), and the extrinsic losses are due to impurities (Fe, Co, Ni, Cu, Ce, Pr, Nd, Sin, Eu, Tb, Dy) and hydroxyl ions (OH). Note that $TiO_2$, $Ga_2O_3$, $Al_2O_3$, $Bi_2O_3$, $Nb_2O_5$, and $Ta_2O_5$ are also conditional glass formers.

The following is a summary of the experimental results, in accordance with the present invention:

The intrinsic absorption at 2.69 μm is less than 0.137 dB/m. At 2.71 μm, the intrinsic absorption is less than 0.048 dB/m. At 2.794 μm, the intrinsic absorption is less than 0.024 μm. At 2.94 μm, the intrinsic absorption is less than 0.021 dB/m.

For total absorption, experimental results showed that at 2.69 μm, 2.71 μm, 2.794 μm, and 2.94 μm, it is less than 3.01 dB/m. Usually, the total absorption is less than 1.51 dB/m. Preferably, the total absorption at these wavelengths is less than 1.0 dB/m.

For the wavelength range of 2.5–3.0 μm, the chemical durability $D_W$ is less than $100.0 \times 10^{-10}$ g/cm$^2$.s. Usually, $D_W$ is less than $10.0 \times 10^{-10}$ g/cm$^2$.s. Preferably, $D^W$ is less than $1.0 \times 10^{-10}$ g/cm$^2$.s.

For increased stability, the glass transition temperature is greater than 500° C. Usually, it is greater than 600° C. Preferably, it is greater than 700° C.

Similarly, for increased stability, the softening point of the glass is greater than 600° C. Usually, it is greater than 680° C. Preferably, it is greater than 760° C.

For increased stability, the thermal expansion coefficient, measured from between 0° and 30° C. to around 300° C., less than $65.0 \times 10^{-7}$/°C. Usually, the thermal expansion coefficient is less than $55.0 \times 10^{-7}$/°C. Preferably, it is less than $45.0 \times 10^{-7}$/°C.

The glasses discussed above support a laser pulse peak power of at least 1.0 kW/cm$^2$. Furthermore, the glasses provide a bend radius of less than 3.0 cm for a 500 μm diameter fiber. The bend radius has also been measured to be less than 2.0 cm for a 500 μm diameter fiber, and even less than 1.0 cm for a 500 μm diameter fiber. Refer to Table L for the set of bend radii, where $D_f$ is the diameter of the fiber in and $r_b$ is the bend radii at failure in cm.

TABLE L

| | | | | Bend Radii | | | | | | | |
|---|---|---|---|---|---|---|---|---|---|---|---|
| Run No. | $GeO_2$ | SrO | ZnO | $Y_2O_3$ | $Ga_2O_3$ | $La_2O_3$ | $ZrO_2$ | $TiO_2$ | $D_f/r_b$ (μm/cm) | $D_f/r_b$ (μm/cm) | $D_f/r_b$ (μm/cm) |
| 1 | 50.0 | 20.0 | 25.0 | 5.0 | — | — | — | — | 80.0/0.2 | 170.0/0.8 | — |
| 2 | 50.0 | 18.75 | 25.0 | 6.25 | — | — | — | — | 90.0/0.2 | 310.0/2.3 | — |
| 3 | 50.0 | 17.5 | 25.0 | 7.5 | — | — | — | — | 90.0/0.4 | 310.0/2.0 | — |
| 4 | 50.0 | 16.25 | 25.0 | 8.75 | — | — | — | — | 610.0/2.8 | — | 250.0/1.3 |
| 5 | 50.0 | 25.0 | 13.75 | 11.25 | — | — | — | — | 140.0/0.7 | 250.0/1.3 | — |
| 6 | 50.0 | 25.0 | 12.5 | 12.5 | — | — | — | — | 170.0/0.6 | 310.0/1.0 | — |
| 7 | 50.0 | 25.0 | 5.0 | 15.0 | 5.0 | — | — | — | 110.0/0.4 | 370.0/1.5 | 400.0/0.3 |
| 8 | 50.0 | 27.5 | — | 17.5 | 10.0 | — | — | — | 200.0/0.7 | — | — |
| 9 | 55.6 | — | 27.8 | — | 5.6 | 5.6 | 5.6 | — | 160.0/0.9 | 170.0/1.6 | — |
| 10 | 50.0 | 20.0 | — | 17.5 | 12.5 | — | — | — | 80.0/0.2 | 120.0/0.25 | 140.0/0.45 |
| 11 | 50.0 | 15.0 | — | 17.5 | 17.5 | — | — | — | 270.0/1.5 | 300.0/2.5 | — |
| 12 | 50.0 | 12.5 | — | 17.5 | 20.0 | — | — | — | 200.0/0.8 | 250.0/1.2 | 270.0/1.5 |
| 13 | 50.0 | 11.25 | — | 15.75 | 18.0 | — | — | — | 150.0/0.2 | 480.0/0.9 | — |
| 14 | 45.0 | 15.0 | — | 17.5 | 17.5 | — | — | 5.0 | 400.0/1.2 | 420.0/2.2 | 480.0/2.0 |
| 15 | 50.0 | 13.5 | — | 15.75 | 15.75 | — | — | 5.0 | 200.0/0.75 | 290.0/1.2 | 340.0/1.1 |
| 16 | 55.0 | 12.0 | — | 14.0 | 14.0 | — | — | 5.0 | 440.0/0.8 | 540.0/3.0 | 570.0/3.0 |
| 17 | 55.0 | 10.0 | — | 10.0 | 20.0 | — | — | 5.0 | 260.0/1.5 | 330.0/1.0 | — |
| 18 | 55.0 | — | — | 15.0 | 25.0 | — | — | 5.0 | 410.0/2.5 | 430.0/1.3 | 440.0/2.0 |

TABLE L-continued

| | | | | | | | | Bend Radii | | |
|---|---|---|---|---|---|---|---|---|---|---|
| Run No. | GeO$_2$ | SrO | ZnO | Y$_2$O$_3$ | Ga$_2$O$_3$ | La$_2$O$_3$ | ZrO$_2$ | TiO$_2$ | D$_f$/r$_b$ (μm/cm) | D$_f$/r$_b$ (μm/cm) | D$_f$/r$_b$ (μm/cm) |
| 19 | 50.0 | 17.5 | — | 17.5 | 15.0 | — | — | — | 270.0/0.6 | 490.0/1.0 | 560.0/1.3 |

In summary, various glass compositions that are non-toxic, stable, provide a high laser damage threshold, and effectively utilize an aim beam are possible. The following glass compositions, in mole percent, provide suitable results:

a. 60.0–80.0% GeO$_2$, 5.0–10.5% Ga$_2$O$_3$, 5.0–8.5% SrO, 1.5–3.0% ZNO, 2.0–7.0% Y$_2$O$_3$, and 8.0–17.0% Ta$_2$O$_5$, and optionally, 0–15.0% Nb$_2$O$_5$, 0–11.0% Gd$_2$O$_3$, and 0–9.0% Yb$_2$O$_3$.

b. 23.0–75.0% GeO$_2$, 4.0–39.0% Ga$_2$O$_3$, 5.0–40.0% SrO, 4.0–45.0% ZnO, and optionally, 0.0–10.0% Y$_2$O$_3$, 0.0–12.0% Ta$_2$O$_5$, 0–15.0% Nb$_2$O$_5$, 0–12.0% Gd$_2$O$_3$, and 0–11.0% Yb$_2$O$_3$.

c. 40.0–79.0% GeO$_2$, 4.0–25.0% La$_2$O$_3$, 4.0–35.0% SrO, 26.0–47.0% ZnO, and optionally, 0.0–7.0% Y$_2$O$_3$, 0.0–10.0% Ta$_2$O$_5$, 0–8.0% Nb$_2$O$_5$, 0–11.0% Gd$_2$O$_3$, and 0–9.0% Yb$_2$O$_3$, the total of La$_2$O$_3$+Y$_2$O$_3$+Gd$_2$O$_3$+Yb$_2$O$_3$ is from 4.0– 30%.

d. 40.0–68.0% GeO$_2$, 4.0–27.0% Ta$_2$O$_5$, 18.0–46.0% SrO, 22.0–52.0% ZnO, and optionally, 0.0–5.0% Y$_2$O$_3$, 0–10.0% Gd$_2$O$_3$, and 0–8.0% Yb$_2$O$_3$.

e. 26.0–76.0% GeO$_2$, 4.0–34.0% Nb$_2$O$_5$, 8.0–51.0% SrO, 40.0–55.0% ZnO, and optionally, 0.0–5.0% Y$_2$O$_3$, 0–10.0% Gd$_2$O$_3$, and 0–8.0% Yb$_2$O$_3$.

f. 51.0–75.0% GeO$_2$, 15.0–33.0% La$_2$O$_3$, 5.0–27.0% Ta$_2$O$_5$, 10.0–24.0% Nb$_2$O$_5$, and optionally, 0.0–9.0% Y$_2$O$_3$, 0–13.0% Gd$_2$O$_3$, and 0–10.0% Yb$_2$O$_3$, the total of La$_2$O$_3$+Y$_2$O$_3$+Gd$_2$O$_3$+Yb$_2$O$_3$ is from 12.0–33.0%.

g. 45.0–87.0% GeO$_2$, 13.0–21.0% La$_2$O$_3$, 4.0–23.0% ZrO$_2$, 18.0–20.0% ZnO, and optionally, 0.0–6.0% Y$_2$O$_3$, 0–10.0% Gd$_2$O$_3$, and 0–8.0% Yb$_2$O$_3$, the total of La$_2$O$_3$+Y$_2$O$_3$+Gd$_2$O$_3$+Yb$_2$O$_3$ is from 12.0–21.0%.

h. 30.0–76.0% GeO$_2$, 10.0–29.0% La$_2$O$_3$, 4.0–54.0% TiO$_2$, 14.0–43.0% SrO, and optionally, 0.0–8.0% Y$_2$O$_3$, 0–13.0% Gd$_2$O$_3$, and 0–11.0% Yb$_2$O$_3$, the total of La$_2$O$_3$+Y$_2$O$_3$+Gd$_2$O$_3$+Yb$_2$O$_3$ is from 8.0–29.0%.

i. 53.0–79.0% GeO$_2$, 4.0–25.0% La$_2$O$_3$, 4.0–36.0% SrO, 9.0–38.0% MgO, and optionally, 0.0–7.0% Y$_2$O$_3$, 0–10.0% Gd$_2$O$_3$, and 0–7.0% Yb$_2$, the total of La$_2$O$_3$+Y$_2$O$_3$+Gd$_2$O$_3$+Yb$_2$O$_3$ is from 2.0–25.0%.

j. 45.0–76.0% GeO$_2$, 9.0–46.0% SrO, 9.0–50.0% MgO, and optionally, 0.0–18.0% Ta$_2$O$_5$, 0.0–5.0% Y$_2$O$_3$, 0–10.0% Gd$_2$O$_3$, and 0–8.0% Yb$_2$O$_3$.

k. 40.0–76.0% GeO$_2$, 4.0–34.0% Nb$_2$O$_5$, 8.0–51.0% SrO, 9.0–49.0% MgO, and optionally, 0.0–5.0% Y$_2$O$_3$, 0–10.0% Gd$_2$O$_3$, and 0–8.0% Yb$_2$O$_3$.

l. 55.0–90.0% GeO$_2$, 3.0–20.0% Ga$_2$O$_3$, 3.0–18.0% SrO, and optionally, 0–5.0% ZnO, 0–8.0% Y$_2$O$_3$, 0–16.0% Ta$_2$O$_5$, 0–9.0% Nb$_2$O$_5$, 0–5.0% La$_2$O$_3$, 0–5.0% Gd$_2$O$_3$, 0–5.0% Yb$_2$O$_3$, 0–10.0% MgO, 0–11.0% TiO$_2$, 0–4.0% HfO$_2$, and 0–5.0% ZrO$_2$.

m. 37.0–67.0% GeO$_2$, 11.0–28.0% Ga$_2$O$_3$, 3.0–23.0% SrO, 4.0–11.0% TiO$_2$, 7.0– 23.5% Y$_2$O$_3$, and optionally, 0–5.0% ZnO, 0–10.0% Ta$_2$O$_5$, 0–10.0% Nb$_2$O$_5$, 0–5.0% La$_2$O$_3$, 0–5.0% Gd$_2$O$_3$, 0–5.0% Yb$_2$O$_3$, 0–10.0% MgO, 0–5.0% HfO$_2$, and 0–7.0% ZrO$_2$.

n. 45.0–60.0% GeO$_2$, 25.0–35.0% ZnO, 4.0–8.0% ZrO$_2$, 4.0–12.0% La$_2$O$_3$, and optionally, 0–8.0% Ga$_2$O$_3$, 0–5.0% Y$_2$O$_3$, 0–4.0% Ta$_2$O$_5$, 0–4.0% Nb$_2$O$_5$, 0–4.0% Gd$_2$O$_3$, 0–4.0% Yb$_2$O$_3$, 0–6.0% HfO$_2$, and 0–5.0% MgO.

o. 55.0–70.0% GeO$_2$, 15.0–30.0% Ga$_2$O$_3$, and optionally, 0–25.0% Gd$_2$O$_3$, 0– 23.0% Yb$_2$O$_3$, 0–27.0% La$_2$O$_3$, and 3.0–19.0% Y$_2$O$_3$, wherein the total of Gd$_2$O$_3$+Yb$_2$O$_3$+La$_2$O$_3$=15.0–30.0%.

p. 24.0–34.0% GeO$_2$, 12.0–20.0% Ga$_2$O$_3$, 24.0–36.0% SrO, 6.0–12.0% ZnO, 4.0–15.0% Nb$_2$O$_5$, and optionally, 0.0–7.5 % Ta$_2$O$_5$.

q. 24.0–31.0% GeO$_2$, 15.0–20.0% Ga$_2$O$_3$, 28.0–36.0% SrO, 8.0–12.0% ZnO, 5.0–15.0% Nb$_2$O$_5$, and optionally, 0.0–7.5 % Ta$_2$O$_5$.

r. 30.0–40.0% GeO$_2$, 10.0–20.0% Ga$_2$O$_3$, 20.0–33.0% SrO, 5.0–10.0% ZnO, 5.0–20.0% Nb$_2$O$_5$, and optionally, 0–10.0% Ta$_2$O$_5$, 0–5.0% La$_2$O$_3$, 0–5.0% Gd$_2$O$_3$, and 0–4% Yb$_2$O$_3$.

s. 50.0–70.0% GeO$_2$, 3.0–20.0% Cs$_2$O, 4.0–12.0% ZrO$_2$, 15.0–23.0% ZnO, and optionally, 0.0–18.0% SrO, 0–8.0% La$_2$O$_3$, 0–7.0% Gd$_2$O$_3$, and 0–6% Yb$_2$O$_3$.

t. 65.0–80.0% GeO$_2$, 10.0–16.0% TiO$_2$, and optionally, 0–8.0% Cs$_2$O, 0.0–6.0% SrO, 0–8.0% Ga$_2$O$_3$, 0–6.0% ZnO, 0–4.0% MgO, 0–6.0% La$_2$O$_3$, 0–5.0% Gd$_2$O$_3$, and 0–4 % Yb$_2$O$_3$.

Although the present invention has been described with reference to a particular embodiment, additional embodiments, applications, and modifications that are obvious to those skilled in the art or are equivalent to the disclosure are included within the spirit and scope of the invention. Therefore, this invention should not be limited to the specific embodiment discussed and illustrated herein, but rather by the following claims and equivalents thereof.

We claim:

1. A glass optical fiber for surgical laser transmission at a wavelength range of approximately 2.5 μm to 3.0 μm comprising a germanate glass substantially free of anions other than oxygen, and substantially free of As, Ba, Be, Bi, Cd, In, Pb, Sb, and Tl and capable of transmitting a useful aim beam to direct the surgical laser.

2. A glass optical fiber of claim 1 wherein the germanate glass displays an intrinsic absorption of less than 0.138 dB/m in the wavelength range.

3. A glass optical fiber of claim 2 wherein the intrinsic absorption at 2.69, 2.71, 2.794, and 2.94 μm is less than 0.137, 0.048, 0.024 and 0.021 dB/m, respectively.

4. A glass optical fiber of claim 1 wherein the germanate glass displays a total absorption, where total absorption is the sum of the intrinsic and extrinsic absorptions, less than 3.01 dB in the wavelength range.

5. A glass optical fiber of claim 1 wherein the germanate glass delivers at least 1.0 kW/cm$^2$ of laser pulse peak power.

6. A glass optical fiber of claim 1 wherein the germanate glass displays a chemical durability D$_w$ less than $100.0 \times 10^{-10}$ g/cm$^2$.s.

7. A glass optical fiber of claim 1 wherein the germanate glass displays a glass transition temperature greater than 500° C.

8. A glass optical fiber of claim 1 wherein the germanate glass displays a softening point greater than 600° C.

9. A glass optical fiber of claim 1 wherein the germanate glass displays a thermal expansion coefficient, measured from between 0° and 30° C. to around 300° C., less than $65.0 \times 10^{-7}$/°C.

10. A glass optical fiber of claim 1 wherein the germanate glass displays a fiber bend radius of less than 3.0 cm for a 500 μm diameter fiber.

11. A glass optical fiber comprising a germanate glass substantially free of anions other than oxygen, and substantially free of As, Ba, Be, Bi, Cd, In, Pb, Sb, and Tl.

12. A glass optical fiber of claim 11 wherein the germanate glass composition comprises, in mole percent, 60.0–80.0% $GeO_2$, 5.0–10.5% $Ga_2O_3$, 5.0–8.5% SrO, 1.5–3.0% ZnO, 2.0–7.0% $Y_2O_3$, and 8.0–17.0% $Ta_2O_5$, and optionally, 0–15.0% $Nb_2O_5$, 0–11.0% $Gd_2O_3$, and 0–9.0% $Yb_2O_3$.

13. A glass optical fiber of claim 11 wherein the germanate glass composition comprises, in mole percent, 23.0–75.0% $GeO_2$, 4.0–39.0% $Ga_2O_3$, 5.0–40.0% SrO, 4.0–45.0% ZnO, and optionally, 0.0–10.0% $Y_2O_3$, 0.0–12.0% $Ta_2O_5$, 0–15.0% $Nb_2O_5$, 0–12.0% $Gd_2O_3$, and 0–11.0% $Yb_2O_3$.

14. A glass optical fiber of claim 11 wherein the germanate glass composition comprises, in mole percent, 40.0–79.0% $GeO_2$, 4.0–25.0% $La_2O_3$, 4.0–35.0% SrO, 26.0–47.0% ZnO, and optionally, 0.0–7.0% $Y_2O_3$, 0.0–10.0% $Ta_2O_5$, 0–8.0% $Nb_2O_5$, 0–11.0% $Gd_2O_3$, and 0–9.0% $Yb_2O_3$, the total of $La_2O_3+Y_2O_3+Gd_2O_3+Yb_2O_3$ is from 4.0–30.0%.

15. A glass optical fiber of claim 11 wherein the germanate glass composition comprises, in mole percent, 40.0–68.0% $GeO_2$, 4.0–27.0% $Ta_2O_5$, 18.0–46.0% SrO, 22.0–52.0% ZnO, and optionally, 0.0–5.0% $Y_2O_3$, 0–10.0% $Gd_2O_3$, and 0–8.0% $Yb_2O_3$.

16. A glass optical fiber of claim 11 wherein the germanate glass composition comprises, in mole percent, 26.0–76.0% $GeO_2$, 4.0–34.0% $Nb_2O_5$, 8.0–51.0% SrO, 40.0–55.0% ZnO, and optionally, 0.0–5.0% $Y_2O_3$, 0–10.0% $Gd_2O_3$, and 0–8.0% $Yb_2O_3$.

17. A glass optical fiber of claim 11 wherein the germanate glass composition comprises, in mole percent, 51.0–75.0% $GeO_2$, 15.0–33.0% $La_2O_3$, 5.0–27.0% $Ta_2O_5$, 10.0–24.0% $Nb_2O_5$, and optionally, 0.0–9.0% $Y_2O_3$, 0–13.0% $Gd_2O_3$, and 0–10.0% $Yb_2O_3$, the total of $La_2O_3+Y_2O_3+Gd_2O_3+Yb_2O_3$ is from 12.0–33.0%.

18. A glass optical fiber of claim 11 wherein the germanate glass composition comprises, in mole percent, 45.0–87.0% $GeO_2$, 13.0–21.0% $La_2O_3$, 4.0–23.0% $ZrO_2$, 18.0–20.0% ZnO, and optionally, 0.0–6.0% $Y_2O_3$, 0–10.0% $Gd_2O_3$, and 0–8.0% $Yb_2O_3$, the total of $La_2O_3+Y_2O_3+Gd_2O_3+Yb_2O_3$ is from 12.0–21.0%.

19. A glass optical fiber of claim 11 wherein the germanate glass composition comprises, in mole percent, 30.0–76.0% $GeO_2$, 10.0–29.0% $La_2O_3$, 4.0–54.0% $TiO_2$, 14.0–43.0% SrO, and optionally, 0.0–8.0% $Y_2O_3$, 0–13.0% $Gd_2O_3$, and 0–11.0% $Yb_2O_3$, the total of $La_2O_3+Y_2O_3+Gd_2O_3+Yb_2O_3$ is from 8.0–29.0%.

20. A glass optical fiber of claim 11 wherein the germanate glass composition comprises, in mole percent, 53.0–79.0% $GeO_2$, 4.0–25.0% $La_2O_3$, 4.0–36.0% SrO, 9.0–38.0% MgO, and optionally, 0.0–7.0% $Y_2O_3$, 0–10.0% $Gd_2O_3$, and 0–7.0% $Yb_2O_3$, the total of $La_2O_3+Y_2O_3+Gd_2O_3+Yb_2O_3$ is from 2.0–25.0%.

21. A glass optical fiber of claim 11 wherein the germanate glass composition comprises, in mole percent, 45.0–76.0% $GeO_2$, 9.0–46.0% SrO, 9.0–50.0% MgO, and optionally, 0.0–18.0% $Ta_2O_5$, 0.0–5.0% $Y_2O_3$, 0–10.0% $Gd_2O_3$, and 0–8.0% $Yb_2O_3$.

22. A glass optical fiber of claim 11 wherein the germanate glass composition comprises, in mole percent, 40.0–76.0% $GeO_2$, 4.0–34.0% $Nb_2O_5$, 8.0–51.0% SrO, 9.0–49.0% MgO, and optionally, 0.0–5.0% $Y_2O_3$, 0–10.0% $Gd_2O_3$, and 0–8.0% $Yb_2O_3$.

23. A glass optical fiber of claim 11 wherein the germanate glass composition comprises, in mole percent, 55.0–90.0% $GeO_2$, 3.0–20.0% $Ga_2O_3$, 3.0–18.0% SrO, and optionally, 0–5.0% ZnO, 0–8.0% $Y_2O_3$, 0–16.0% $Ta_2O_5$, 0–9.0% $Nb_2O_5$, 0–5.0% $La_2O_3$, 0–5.0% $Gd_2O_3$, 0–5.0% $Yb_2O_3$, 0–10.0% MgO, 0–11.0% $TiO_2$, 0–4.0% $HfO_2$, and 0–5.0% $ZrO_2$.

24. A glass optical fiber of claim 11 wherein the germanate glass composition comprises, in mole percent, 37.0–67.0% $GeO_2$, 11.0–28.0% $Ga_2O_3$, 3.0–23.0% SrO, 4.0–11.0% $TiO_2$, 7.0–23.5% $Y_2O_3$, and optionally, 0–5.0% ZnO, 0–10.0% $Ta_2O_5$, 0–10.0% $Nb_2O_5$, 0–5.0% $La_2O_3$, 0–5.0% $Gd_2O_3$, 0–5.0% $Yb_2O_3$, 0–10.0% MgO, 0–5.0% $HfO_2$, and 0–7.0 % $ZrO_2$.

25. A glass optical fiber of claim 11 wherein the germanate glass composition comprises, in mole percent, 45.0–60.0% $GeO_2$, 25.0–35.0% ZnO, 4.0–8.0% $ZrO_2$, 4.0–12.0% $La_2O_3$, and optionally, 0–8.0% $Ga_2O_3$, 0–5.0% $Y_2O_3$, 0–4.0% $Ta_2O_5$, 0–4.0% $Nb_2O_5$, 0–4.0% $Gd_2O_3$, 0–4.0% $Yb_2O_3$, 0–6.0% $HfO_2$, and 0–5.0% MgO.

26. A glass optical fiber of claim 11 wherein the germanate glass composition comprises, in mole percent, 55.0–70.0% $GeO_2$, 15.0–30.0% $Ga_2O_3$, and optionally, 0–25.0% $Gd_2O_3$, 0–23.0% $Yb_2O_3$, 0–27.0% $La_2O_3$, and 3.0–19.0% $Y_2O_3$, wherein the total of $Gd_2O_3+Yb_2O_3+La_2O_3=15.0$–30.0%.

27. A glass optical fiber of claim 11 wherein the germanate glass composition comprises, in mole percent, 24.0–34.0% $GeO_2$, 12.0–20.0% $Ga_2O_3$, 24.0–36.0% SrO, 6.0–12.0% ZnO, 4.0–15.0% $Nb_2O_5$, and optionally, 0.0–7.5% $Ta_2O_5$.

28. A glass optical fiber of claim 11 wherein the germanate glass composition comprises, in mole percent, 24.0–31.0% $GeO_2$, 15.0–20.0% $Ga_2O_3$, 28.0–36.0% SrO, 8.0–12.0% ZnO, 5.0–15.0% $Nb_2O_5$, and optionally, 0.0–7.5% $Ta_2O_5$.

29. A glass optical fiber of claim 11 wherein the germanate glass composition comprises, in mole percent, 30.0–40.0% $GeO_2$, 10.0–20.0% $Ga_2O_3$, 20.0–33.0% SrO, 5.0–10.0% ZnO, 5.0–20.0% $Nb_2O_5$, and optionally, 0–10.0% $Ta_2O_5$, 0–5.0% $La_2O_3$, 0–5.0% $Gd_2O_3$, and 0–4% $Yb_2O_3$.

30. A glass optical fiber of claim 11 wherein the germanate glass composition comprises, in mole percent, 50.0–70.0% $GeO_2$, 3.0–20.0% $Cs_2O$, 4.0–12.0% $ZrO_2$, 15.0–23.0% ZnO, and optionally, 0.0–18.0% SrO, 0–8.0% $La_2O_3$, 0–7.0% $Gd_2O_3$, and 0–6% $Yb_2O_3$.

31. A glass optical fiber of claim 11 wherein the germanate glass composition comprises, in mole percent, 65.0–80.0% $GeO_2$, 10.0–16.0% $TiO_2$, and optionally, 0–8.0% $Cs_2O$, 0.0–6.0% SrO, 0–8.0% $Ga_2O_3$, 0–6.0% ZnO, 0–4.0% MgO, 0–6.0% $La_2O_3$, 0–5.0% $Gd_2O_3$, and 0–4% $Yb_2O_3$.

32. A glass optical fiber for surgical laser transmission at a wavelength range of 2.5 μm to 3.0 μm comprising a non-toxic germanate glass wherein the germanate glass exhibits:

an ability to transmit an aim beam and the surgical laser beam;

intrinsic absorption of less than approximately 0.138 dB/m at the wavelength range;

total absorption, where total absorption is the sum of the intrinsic and extrinsic absorptions, of less than approximately 3.01 dB/m at the wavelength range;

power handling ability to withstand a laser pulse peak power of at least approximately 1.0 kW/cm$^2$;

high chemical durability with $D_w$ less than approximately $100.0 \times 10^{-10}$ g/cm$^2$.s;

glass transition temperature greater than 500° C.;

softening point greater than approximately 600° C.;

thermal expansion coefficient, measured from between 0° and 30° C. to around 300° C., less than approximately $65.0 \times 10^{-7}$/°C.; and fiber bend radius less than approximately 3.0 cm for a 500 μm diameter fiber.

33. An optical fiber glass comprising GeO$_2$ and at least one element selected from the group consisting of: Ga$_2$O$_3$, SrO, ZnO, Y$_2$O$_3$, Ta$_2$O$_5$, Nb$_2$O$_5$, Gd$_2$O$_3$, Yb$_2$O$_3$, La$_2$O$_3$, ZrO$_2$, TiO$_2$, MgO, HfO$_2$, and Cs$_2$O, and being substantially free of the oxides, fluorides, and chlorides of the elements As, Ba, Be, Bi, Cd, In, Pb, Sb, and Tl.

34. An optical fiber glass comprising a mixture of Ga$_2$O$_3$, SrO, GeO$_2$, and R$_n$O$_m$, wherein R$_n$O$_m$ is at least one of the following: ZnO, Y$_2$O$_3$, Ta$_2$O$_5$, Nb$_2$O$_5$, Gd$_2$O$_3$, Yb$_2$O$_3$, La$_2$O$_3$, ZrO$_2$, TiO$_2$, MgO, HfO$_2$, and Cs$_2$O.

* * * * *